Patented Feb. 19, 1952

2,586,377

UNITED STATES PATENT OFFICE 2,586,377

DEHYDROGENATION OF HYDROCARBONS WITH SYNTHETIC GEL-TYPE METAL OXIDE CATALYSTS

Emory W. Pitzer, Bartlesville, Okla., assignor to Phillips Petroleum Company, a corporation of Delaware No Drawing. Application December 31, 1947, Serial No. 795,150

14 Claims. (Cl. 260—668)

This invention relates to an improved catalyst for hydrocarbon conversion. In one embodiment the invention relates to a catalyst especially adapted to changing the carbon-to-hydrogen ratio of hydrocarbons. This invention relates also to improved hydrogenation and dehydrogenation processes utilizing such a catalyst. The present invention also relates to an improved process for the preparation of a hydrocarbon conversion catalyst of the gel type. The present invention is particularly suited to the preparation of coprecipitated gels, for example, chromia-alumina gels and alumina-chromia-beryllia gels. Catalysts prepared in accordance with this invention have higher activity, longer life, and, apparently, greater surface area per unit of mass, than coprecipitated-gel catalysts prepared by previously known methods. This application is a continuation-in-part of my copending application Serial No. 706,091, filed October 28, 1946, now U. S. Patent 2,536,085, issued January 2, 1951.

Various hydrocarbons, particularly those containing at least two and not more than ten carbon atoms per molecule, must frequently be dehydrogenated to produce more unsaturated materials suitable for various purposes in the chemical and petroleum industries. Such reactions include dehydrogenation of butane to produce butylenes, dehydrogenation of butylenes to produce butadiene, dehydrogenation of other paraffins to produce the corresponding olefins, dehydrogenation of olefins to produce corresponding diolefins, dehydrogenation of naphthenes to produce aromatics, and dehydrocyclization of aliphatic hydrocarbons to produce aromatic hydrocarbons. Conversely, it is frequently desirable to effect hydrogenation of unsaturated material to produce more saturated products, for example, hydrogenation of aromatic hydrocarbons to produce cyclo-aliphatic hydrocarbons, and hydrogenation of petroleum fractions containing olefinic materials to effect saturation thereof.

As catalyst for such reactions, refractory metal oxides and mixtures thereof, in various forms, have been used. Such catalysts include, for example, alumina-containing gels, such as chromia-alumina, silica-alumina, etc. Various heavy metals and metal oxides have been used as hydrogenation and dehydrogenation catalysts, either alone or in admixture with catalytic or non-catalytic materials. Various procedures for the preparation of catalysts have been heretofore employed. These include coprecipitation of concentrated sols to produce gel catalysts, mechanical mixing components of composite catalysts, and deposition of active catalytic material on non-catalytic or less active catalytic materials. Particularly effective catalysts for these reactions are those containing a mixture of oxides of chromium and aluminum. These catalysts, while quite effective, leave considerable room for improvement, as to degree of activity, effective life, efficiency, per pass conversion rate, stability to regeneration, etc. Conventional alumina-containing catalysts appear to lose activity on regeneration due to the formation therein of alpha-alumina, an inactive form of aluminum oxide. This inactive form appears to result from subjecting the catalyst to excessively high temperatures, as in regeneration. This phenomenon appears to occur to an appreciable extent in chromia-alumina catalysts of the gel type, especially those which are particularly useful for dehydrogenation reactions.

In the past, precipitation of the gelatinous hydrous oxides has been effected by the preparation of separate sols from metal salts by addition of a controlled amount of an alkali, for example, ammonium hydroxide; mixing the sols; and completion of the precipitation by addition of an excess of dilute alkali to the sol mixture. Precipitation in this manner is generally carried out by portionwise addition of small increments of dilute ammonium hydroxide over a period of several hours, first to the separate solutions to form sols and then to the mixed sols to form the coprecipitated gel. Another procedure which is said to be effective for the coprecipitation of mixed metal salts in an aqueous solution involves continuous precipitation by flowing the solution to a mixing zone, then after some time lag, introducing a stream of precipitants to the mixing zone at a rate such that the precipitant is never present in the zone in the amount required for complete precipitation of the salt.

I have now found, contrary to teachings of the prior art, that a coprecipitated gel of uniform composition may be prepared by the rapid addition of a precipitant to a solution of mixed metal salts. In the present procedure, rapid precipitation is effected in one step by the addition of concentrated precipitant, preferably ammonium hydroxide, to the dilute metal salt mixture at a relatively high rate. By the process of the present invention, precipitation of the gel is accomplished without the necessity of the formation of separate sols and without the necessity of special mixing techniques during the precipitation from the solution. The alumina-containing catalyst prepared by my improved method shows extraordinary resistance to the formation of inactive alpha-alumina upon regeneration. It also is particularly active, and long lived, when used as a catalyst to promote dehydrogenation of hydrocarbons.

I have now discovered an improved method for the preparation of a gel-type catalyst whereby the catalyst may be prepared in commercial quantities in a rapid and efficient manner. This invention is particularly effective for the production of gel catalyst containing alumina as the major component. A gel catalyst prepared by the procedure disclosed herein is more active and more efficient than a gel catalyst of the same composition prepared by conventional methods. The process disclosed herein may be effectively used for the preparation of the chromia-alumina-beryllia gel catalyst disclosed in the copending application of James R. Owen, Serial Number 641,416, filed January 15, 1946, now U. S. Patent 2,483,929, issued October 4, 1949. These catalysts show satisfactory resistance to destruction of their amorphous gel structure and only slight formation of alpha-alumina, during use at high temperatures. A chromia-alumina-beryllia gel prepared in accordance with the present invention has an extremely high surface area per unit of mass and a higher efficiency and longer life than catalysts of similar composition prepared by admixing the metal oxides or by impregnation of alumina with salts of chromium and beryllium.

An object of the present invention is to provide a novel catalyst particularly adapted to hydrocarbon conversions wherein the carbon-to-hydrogen ratio of the hydrocarbons is changed. A further object of the present invention is to provide a novel catalyst for the dehydrogenation of paraffins and olefins. Another object to to provide an improved process for the preparation of gel-type catalysts. Still another object of the invention is to provide an improved process for the conversion of hydrocarbons utilizing the catalysts of this invention. A further object of my invention is to dehydrogenate hydrocarbons. Another object of my invention is to change the hydrogen-carbon ratio of hydrocarbons. An additional object of my invention is to hydrogenate, or increase the hydrogen-carbon ratio of hydrocarbons. A further object is to produce aromatic hydrocarbons. Other objects and advantages of my invention will become obvious, to those skilled in the art, from the accompanying disclosure and discussion.

In methods of preparation previously used, a metal salt has been precipitated from a sol, the precipitate separated from the solute or dispersing liquid by filtration, and washed with water. It has now been found that it is desirable to have ammonium nitrate present in the catalyst preparation mixture until the final ignition step. I have found that the customary practice of removing the extraneous salts from the precipitate by washing with water is detrimental to the catalyst. Washing with water not only removes any ammonium nitrate present but also may remove traces of water-soluble complex salts that promote dehydrogenation. Washing with water also tends, apparently, to cause structural rearrangements that decrease the surface area of the catalyst. Thus in the present invention, by omitting the customary washing step, the activity of the catalyst is improved.

I have found, as indicated above, that a high concentration of ammonium nitrate in the coprecipitated gel is desirable; the presence of ammonium nitrate results in increased activity of the gel catalyst. Catalytic activity is improved when ammonium nitrate is included in the gel structure; however, the simple addition of ammonium nitrate to the finished catalyst fails to increase the activity of the catalyst. Thus, the presence of ammonium nitrate on the surface of the dry gel particles does not improve the catalytic properties of the gel. Inclusion of ammonium nitrate in the gel mass in accordance with my invention may be effected by adding ammonium nitrate to the initial solution of metal salts, preferably metal nitrates. When coprecipitated-gel catalysts are prepared by the formation of sols, for example, by the process disclosed by James R. Owen above referred to, the ammonium nitrate may be added to the sol mixture; in accordance with this invention deliberately controlled sol formation is preferably omitted.

In methods of preparation used heretofore, the metal salts, usually metal nitrate hydrates, are heated, usually to about 200° F. to dissolve the salt in the water of hydration, and at least a part of the precipitation is carried out at elevated temperatures. It has now been found that a catalyst of increased activity may be obtained by conducting the preparation at room temperature, i. e. 50 to 100° F., up to the drying step.

By coprecipitation in accordance with the present invention, various components can be combined in the gel in the desired proportions. Higher proportions of the minor components are possible by coprecipitation than may be obtained by impregnation of the major component or carrier material. The finished gel catalyst may be made up of oxides of various metals, particularly the oxides of beryllium, aluminum, zirconium, vanadium, chromium, molybdenum, and/or tungsten. In the preparation of the catalyst, a solution of metal salts decomposable on heating to the metal oxides is first made up and then precipitated, preferably in the presence of ammonium nitrate. The metal nitrates are generally preferred, but other decomposable metal salts, for example, acetates, chlorides, and sulfates, may also be used. The chlorides and sulfates are undesirable in the final catalyst; conversion of the chlorides or sulfates to the oxides is preferably carried out in the presence of a stream of gas effecting complete decomposition of the chlorides or sulfates.

In accordance with this invention a mixture of metal salts, preferably metal nitrates, is dissolved in water at room temperature, i. e. 50 to 100° F. preferably also with the addition of ammonium nitrate to the solution. The total concentration of metal salts in the aqueous solution is preferably about 0.25 molar. The amount of ammonium nitrate present, both from added ammonium nitrate and that resulting from subsequent reaction of added ammonium hydroxide and nitrates, should be at least about twice the molar quantity of total metal salts, and may be as much higher as the aqueous mixture will hold in solution. Precipitation of the metal salts as hydroxides is carried out at room temperature by adding a concentrated solution of an alkali, preferably ammonium hydroxide, rapidly to the aqueous solution without controlled intermediate sol formation. The hydroxide gel so obtained is recovered immediately and dried at about 200° F. Immediate separation of the precipitate from the solution is desirable; the catalyst appears to lose activity if the settling period preceding separation, usually by filtration, is unduly prolonged. Therefore by "immediately" I mean that separation is effected as soon as the available facilities permit, and without any definite intervening digestion period. The extraneous salts are removed by thermal decomposition and the gel is further improved by heat treatment at 750° F. The precipitation is preferably carried out batchwise by the addition of a concentrated solution of the precipitant rapidly to the desired quantity of the solution of metal salts with continuous agitation at a relatively rapid rate. The time required for the addition of the precipitant may vary from about 15 minutes to about 2 hours. Catalysts prepared by the method of my invention when compared with catalysts prepared by other methods demonstrate superior activity, efficiency, and effective life.

The present invention relates particularly to the use of such materials as catalysts in processes for adding hydrogen to, or taking hydrogen from, hydrocarbons. They are particularly effective in dehydrogenating normal butane to normal butenes, cyclohexane to benzene, ethyl benzene to styrene, and analogous reactions involving homologues of these materials. These catalysts may be used to advantage in the dehydrogenation of any dehydrogenatable hydrocarbon, under conditions of temperature, pressure, and reaction time within conventional ranges, such as 900 to 1300° F., up to 500 p. s. i. g., and 0.5 to 5 liquid volumes of charge per volume of catalyst per hour, and are especially advantageous when treating hydrocarbons having at least two and not more than ten carbon atoms per molecule.

The following specific examples serve to illustrate the present invention, in contrast to prior practices. These examples are typical of the invention, but should not be used to limit it unduly.

EXAMPLE I

The preparation of catalysts in accordance with this invention is illustrated by the following procedure for the preparation of a dehydrogenation catalyst containing 50 per cent alumina, 40 per cent chromia, and 10 per cent beryllia, all being per cent by weight.

The desired amounts of metal nitrates, for example, 1656 grams of $Al(NO_3)_3.9H_2O$, 947 grams of $Cr(NO_3)_3.9H_2O$, and 369 grams of $Be(NO_3)_2 4H_2O$, are dissolved in 32 liters of water at room temperature. Preferably ammonium nitrate is added to the solution of metal nitrates. An amount equal to that formed by the reaction of the ammonium hydroxide with the metal nitrates gives a beneficial effect. Higher amounts, up to that sufficient to saturate the solution, may be used if desired. Rapid precipitation of the metal hydroxides is effected at room temperature by the addition, with vigorous stirring, of 57 per cent ammonium hydroxide to the solution of metal nitrates at a rate of 600 ml. per hour. Addition of the concentrated ammonium hydroxide is continued until the pH of the solution is within the range of from about 5.2 to about 8.5. The mixture is immediately filtered at room temperature and the residue is then dried at 200° F. Filtration of precipitate is improved by increasing the pH above about 5.2, the value at which precipitation takes place; a pH above about 6 results in satisfactory filtration. After the material is dried, it is heated, over a period of 30 minutes, to a temperature of 750° F. and is maintained at this temperature for 18 to 36 hours. The catalytic material resulting from the heat treatment is spread in a ¼-inch layer and exposed to air of high relative humidity for an additional 48 hours. The resulting material is then mixed with a binder-lubricant, such as hydrogenated corn oil, hydrogenated peanut oil, or the like, and is ground until about 85 per cent is of 100 to 325 mesh size and the remaining 15 per cent is finer. From this material, pellets are formed which have a crushing strength of 3 to 10 pounds. The binder is burned out in a tubular furnace by heating from 75 to 1000° F. in 3 hours while air is introduced at a space velocity of about 1000 volumes of air per volume of catalyst per hour. The temperature is maintained at 1000° F. while the air flow is continued for 10 to 30 hours. The catalyst is then ready for use.

EXAMPLE II

This example shows that the catalytic activity of a coprecipitated gel catalyst may be increased by precipitating the gels at room temperature.

(a) The preparation of a catalyst containing, by weight, 10 per cent $Cr_2O_3$ and 90 per cent $Al_2O_3$ as a coprecipitated gel was carried out at 194° F. The sol of each metal hydroxide was prepared separately by dissolving the metal nitrate hydrate in its own water of hydration 203° F. and adding 70 per cent of the concentrated aqueous ammonia stoichiometrically required for completion of the hydrous oxide formation. The sols were mixed and diluted with hot water. Dilute aqueous ammonia was added to the heated sol mixture until the pH of the mixture was 7.0. The temperature of the gel mixture was maintained at 194° F. during the settling period. The hot gel mixture was filtered and the gel cake was dried at about 194° F. Extraneous salts were thermally decomposed by heating the dry gel in a tubular furnace from 77 to 932° F. in 3 hours. The granular catalyst (8 to 14 mesh rating) was tested using technical normal butane (97 per cent n-butane, 3 per cent isobutane) in alternate 1-hour dehydrogenation and regeneration periods.

(b) A second coprecipitated-gel dehydrogenation catalyst was prepared in the same manner as the catalyst described in part (a) except that the metal nitrates were dissolved in a minimum amount of water at room temperature (77° F.), and the concentrated ammonia was added to the metal nitrate solutions at room temperature. The catalyst was tested under the same conditions as the catalyst of part (a). The per-pass conversion to butylenes plus butadiene was 8.2 per cent higher than for the catalyst of part (a).

EXAMPLE III

This example shows the effect of washing on the activity of coprecipitated-gel catalysts.

Two granular 10% $Cr_2O_3$–90% $Al_2O_3$ coprecipitated-gel type catalysts (8 to 14 mesh) were tested at 1100° F. and a space velocity of 1000 v./v./hr. with technical n-butane. The catalysts were prepared as follows:

(a) A coprecipitated gel prepared by adding ammonium hydroxide to a solution of aluminum and chromium nitrates as disclosed herein, was filtered after a settling period of six days following precipitation. Washing was omitted. After ignition, the resulting catalyst gave a total conversion to butylenes and butadiene of 41.0 per cent and a coke deposit of 3.7 weight per cent of the charge.

(b) A second catalyst, which was prepared by the same procedure used in preparing the catalyst of part (a) except that the coprecipitated gel was washed with six 5-gallon portions of water after filtration, gave a conversion of only 20.9 per cent and a coke deposit of 0.5 weight per cent of the charge.

EXAMPLE IV

Two coprecipitated-gel catalysts were prepared which were identical with the exception of the ammonium nitrate content of the gels. Additional ammonium nitrate recovered from the supernatant liquid from previous catalyst preparations was added to the nitrate solution used in preparing one of the catalysts. The compositions of the finished catalysts were approximately 10% BeO–40% $Cr_2O_3$–50% $Al_2O_3$ following ignition of the gel to the oxide form. Technical normal butane was dehydrogenated with the catalysts at 990° F. and a space velocity of 750. Conversions to butylenes plus butadiene of 37.5 per cent for the catalyst prepared without added ammonium nitrate and 38.5 per cent for the catalyst prepared with addition of ammonium nitrate were obtained. A 1-per cent increase in conversion to butylenes plus butadiene was occasioned by the addition of ammonium nitrate to the metal nitrate solution.

EXAMPLE V

Cyclohexane was dehydrogenated to produce benzene, using a catalyst prepared as in Example I, and having the same composition. The cyclohexane feedstock had the composition and properties listed in Table I.

*Table I*

| | Liquid volume, per cent |
|---|---|
| n-Hexane | 0.1 |
| Methyl cyclopentane | 2.5 |
| 2-2 dimethyl pentane | 0.7 |
| Benzene | 0.0 |
| 2-4 dimethyl pentane | 4.0 |
| Cyclohexane | 84.7 |
| 2-2-3 trimethyl butane | 0.9 |
| 3-3 dimethyl pentane | 1.2 |
| 1-1 dimethyl cyclopentane | 0.5 |
| 2-3 dimethyl pentane | 0.4 |
| 2 methyl hexane | 5.0 |
| | 100.0 |

Other properties of the feedstock follow:

| | |
|---|---|
| Gravity, °API @ 60° F. | 51.8 |
| Specific gravity, 60/60 | 0.7721 |
| Density #/gal. –60° F. | 6.44 |
| Aniline point °F | 93.4 |
| Sulfur (ASTM) percent | 0.0306 |
| R. V. P. (ASTM) | 3.0 |
| Distillation: | |
| IBP °F | 173 |
| 10% °F | 175 |
| 50% °F | 175 |
| 90% °F | 175 |
| DP °F | 177 |

A bed of the granular catalyst was placed in a vertical, tubular catalyst chamber heated by hot flue-gas flowing transversely to the tube. The dehydrogenation was carried out in cycles of one hour duration each, with regeneration of the catalyst by burning off carbonaceous material with an air-flue gas mixture in between each cycle. Heat was supplied during the dehydrogenation cycle so as to maintain a desired dehydrogenation temperature. Results obtained at each of three different dehydrogenation temperatures are presented in Table II. The "yield" is mols of benzene produced per 100 mols of feed. The "conversion" is mols of cyclohexane destroyed per 100 mols of feed. The "selectivity" is mols of benzene produced per 100 mols of cyclohexane destroyed; it is also referred at times as "ultimate yield" or as "efficiency."

*Table II*

DEHYDROGENATION CYCLE

| Run-Cycle | 17 | 37 | 97 |
|---|---|---|---|
| Temperature, ° F.: | | | |
| Catalyst Tube Wall | 1,025 | 1,091 | 1,203 |
| Catalyst Bed (1) | 985 | 1,041 | 1,157 |
| Space Velocity | 498 | 521 | 506 |
| Effluent Volume—SCFH (Ideal) | 88.2 | 163.9 | 214.2 |
| Pressure: | | | |
| Preheater Coil Inlet, p. s. i. g | 11.5 | 15.0 | 14.0 |
| Catalyst Tube Outlet, in Hg | 1.1 | 1.2 | 1.6 |
| Fractional Analysis, Wt. Per Cent: | | | |
| $H_2$ | 1.72 | 3.45 | 4.24 |
| $CH_4$ | 0.38 | 1.26 | 1.93 |
| $C_2H_4$ | | 0.03 | 0.41 |
| $C_2H_6$ | | 0.86 | 3.34 |
| $C_3H_6$ | 1.39 | 0.22 | 1.41 |
| $C_3H_8$ | | 0.64 | 1.69 |
| $C_4H_8$ | | 0.85 | 2.61 |
| $C_4H_{10}$ | | 1.15 | 2.00 |
| $C_5H_{10}$ | 0.18 | | |
| $C_5H_{12}$ | 0.39 | | |
| $C_6H_6$ (Benzene) | 25.20 | 38.60 | 54.91 |
| $C_6H_{12}$ (Cyclohexane) | 51.38 | 34.40 | 12.58 |
| Other Olefins | 5.17 | 4.93 | 3.02 |
| Other Paraffins | 10.82 | 9.87 | 4.70 |
| Heavies (B. P.>180° F.) | 2.84 | 2.68 | 3.86 |
| Coke | 0.53 | 1.06 | 3.30 |
| | 100.00 | 100.00 | 100.00 |
| Conversion, Mol Per Cent | 31.8 | 49.2 | 71.7 |
| Selectivity, Mol Per Cent | 88.1 | 87.0 | 84.9 |
| Yield Per Pass, Benzene | 28.0 | 42.8 | 60.9 |
| Weight of Effluent (Gas), Lb | 2.86 | 3.34 | 5.79 |
| Weight of Effluent (Liquid), Lb | 19.69 | 18.48 | 15.09 |
| Regeneration After Cycle Studied: | | | |
| Average Mol Per Cent Oxygen | 1.8 | 1.7 | 2.1 |
| Active Regeneration, Minutes | 21 | 45 | 119 |
| Fresh Air, SCF | 20.3 | 40.7 | 126.9 |
| Pounds Coke Removed | 0.12 | 0.23 | 0.71 |
| Coke, Weight Per Cent of Feed | 0.55 | 1.05 | 3.29 |
| Per Cent Recovery | 106.4 | 99.2 | 99.9 |

EXAMPLE VI

A commercial catalyst prepared by dipping activated alumina pills in chromium trioxide solution to give a composition of 17 to 19 per cent chromia, and a coprecipitated-gel catalyst prepared as in Example I, described above, were tested for cyclohexane dehydrogenation at a liquid hourly space velocity of 1.35 volumes per volume of catalyst. The yields obtained at several temperatures are as follows:

| Temperature, °F. | Volume Per Cent Liquid Effluent | | Volume Per Cent of Charge Recovered | |
|---|---|---|---|---|
| | Dipped | Coprecipitated | Dipped | Coprecipitated |
| 950 | 16 | 19 | 90.4 | 91.9 |
| 1000 | [1] 31 | 34 | [1] 85.2 | 86.6 |
| 1050 | 42 | 50 | 80.0 | 81.3 |
| 1100 | 52 | 56 | | |

[1] Interpolated.

It can be readily seen that both the conversion and ultimate yield are increased by use of the coprecipitated gel of the present invention.

The foregoing examples illustrate the improvements in the catalyst obtained by coprecipitation of metal salts to form gel catalysts by the process of my invention. It will be understood that the theories set forth in the foregoing detailed disclosure do not in any way limit the invention and that the examples are given by way of illustrating various advantages of the present invention and are not to be construed as undue limitations thereof. Variations of the invention may be practiced, in the light of the present disclosure and discussion, without de-

I claim:

1. A process for dehydrogenating hydrocarbons having from 2 to 10 carbon atoms per molecule to less saturated hydrocarbons, which comprises subjecting such a hydrocarbon to reaction conditions including a temperature in the range of 900 to 1300° F., a pressure up to 500 p. s. i. g., and a flow rate in the range of 0.5 to 5 liquid volumes of feed per volume of catalyst per hour, in contact with a synthetic gel catalyst of alumina, chromia, and beryllia prepared by the process which comprises dissolving the nitrates of aluminum, chromium, and beryllium in water at a temperature in the range of 50 to 100° F., admixing with the resulting solution a solution of ammonium hydroxide at a temperature in the range of 50 to 100° F. in such an amount as to bring the pH of the solution within the range of 5.2 to 8.5, drying the resulting precipitate without washing, and heating the unwashed precipitate to a temperature of at least 750° F. so as to convert the metal hydroxides to metal oxides, and recovering less saturated hydrocarbon as a product of the process.

2. The improved process of claim 1 wherein normal butane is dehydrogenated to normal butenes, and a normal butene is recovered as a product of the process.

3. The improved process of claim 1 wherein cyclohexane is dehydrogenated to benzene, and benzene is recovered as a product of the process.

4. The improved process of claim 1 wherein ethyl benzene is dehydrogenated to styrene, and styrene is recovered as a product of the process.

5. The process of claim 1 in which the alumina is at least 50 weight per cent of the catalyst.

6. A process for dehydrogenating hydrocarbons having from 2 to 10 carbon atoms per molecule to less saturated hydrocarbons, which comprises subjecting such a hydrocarbon to reaction conditions including a temperature in the range of 900 to 1300° F., a pressure up to 500 p. s. i. g., and a flow rate in the range of 0.5 to 5 liquid volumes of feed per volume of catalyst per hour, in contact with a synthetic gel catalyst of alumina and chromia prepared by the process which comprises dissolving the nitrates of aluminum and chromium in water at a temperature in the range of 50 to 100° F., admixing with the resulting solution a solution of ammonium hydroxide at a temperature in the range of 50 to 100° F. in such an amount as to bring the pH of the solution within the range of 5.2 to 8.5, drying the resulting precipitate without washing, and heating the unwashed precipitate to a temperature of at least 750° F. so as to convert the metal hydroxides to metal oxides, and recovering less saturated hydrocarbon as a product of the process.

7. The improved process of claim 6 wherein normal butane is dehydrogenated to normal butenes, and a normal butene is recovered as a product of the process.

8. The improved process of claim 6 wherein cyclohexane is dehydrogenated to benzene, and benzene is recovered as a product of the process.

9. The improved process of claim 6 wherein ethyl benzene is dehydrogenated to styrene, and styrene is recovered as a product of the process.

10. A process for dehydrogenating hydrocarbons having from 2 to 10 carbon atoms per molecule to less saturated hydrocarbons, which comprises subjecting such a hydrocarbon to reaction conditions including a temperature in the range of 900 to 1300° F., a pressure up to 500 p. s. i. g., and a flow rate in the range of 0.5 to 5 liquid volumes of feed per volume of catalyst per hour, in contact with a synthetic gel catalyst of alumina, beryllia, and at least one metal oxide selected from the group consisting of the oxides of vanadium, chromium, molybdenum, and tungsten prepared by dissolving the nitrates of the metals in water at a temperature in the range of 50 to 100° F., admixing with the resulting solution a solution of ammonium hydroxide at a temperature in the range of 50 to 100° F. in such an amount as to bring the pH of the solution within the range of 5.2 to 8.5, drying the resulting precipitate without washing, and heating the unwashed precipitate to a temperature of at least 750° F. so as to convert the metal hydroxides to metal oxides, and recovering less saturated hydrocarbon as a product of the process.

11. The improved process of claim 10 wherein normal butane is dehydrogenated to normal butenes, and a normal butene is recovered as a product of the process.

12. The improved process of claim 10 wherein cyclohexane is dehydrogenated to benzene, and benzene is recovered as a product of the process.

13. The improved process of claim 10 wherein ethyl benzene is dehydrogenated to styrene, and styrene is recovered as a product of the process.

14. A process for dehydrogenating hydrocarbons having from 2 to 10 carbon atoms per molecule to less saturated hydrocarbons, which comprises subjecting such a hydrocarbon to reaction conditions including a temperature in the range of 900 to 1300° F., a pressure up to 500 p. s. i. g., and a flow rate in the range of 0.5 to 5 liquid volumes of feed per volume of catalyst per hour, in contact with a synthetic gel catalyst of alumina and at least one metal oxide selected from the group consisting of the oxides of vanadium, chromium, molybdenum, and tungsten prepared by the process which comprises dissolving the nitrates of the metals in water at a temperature in the range of 50 to 100° F., admixing with the resulting solution a solution of ammonium hydroxide at a temperature in the range of 50 to 100° F. in such an amount as to bring the pH of the solution within the range of 5.2 to 8.5, drying the resulting precipitate without washing, and heating the unwashed precipitate to a temperature of at least 750° F. so as to convert the metal hydroxides to metal oxides, and recovering less saturated hydrocarbon as a product of the process.

EMORY W. PITZER.

REFERENCES CITED

The following references are of record in the file of this patent:

UNITED STATES PATENTS

| Number | Name | Date |
|---|---|---|
| 2,217,865 | Groll et al. | Oct. 15, 1940 |
| 2,322,863 | Marschner et al. | June 29, 1943 |
| 2,393,537 | Huffman | Jan. 22, 1946 |
| 2,536,085 | Pitzer | Jan. 2, 1951 |